United States Patent
Ford et al.

[11] Patent Number: 5,818,890
[45] Date of Patent: Oct. 6, 1998

[54] METHOD FOR SYNCHRONIZING SIGNALS AND STRUCTURES THEREFOR

[75] Inventors: David K. Ford, Gilbert; Philip A. Jeffery, Tempe; Phuc C. Pham, Chandler, all of Ariz.

[73] Assignee: Motorola, Inc., Schaumburg, Ill.

[21] Appl. No.: 719,423

[22] Filed: Sep. 24, 1996

[51] Int. Cl.⁶ ........................................ H03D 3/24
[52] U.S. Cl. ................... 375/371; 375/373; 370/518; 370/519; 327/271; 327/277
[58] Field of Search ..................... 375/371, 373; 370/516–519; 327/269, 271, 276, 277

[56] References Cited

U.S. PATENT DOCUMENTS

| | | | |
|---|---|---|---|
| 5,022,056 | 6/1991 | Henderson et al. | 375/373 |
| 5,166,959 | 11/1992 | Chu et al. | 375/20 |
| 5,245,231 | 9/1993 | Kocis et al. | 327/277 |
| 5,349,612 | 9/1994 | Guo et al. | 375/371 |
| 5,400,370 | 3/1995 | Guo | 375/371 |

*Primary Examiner*—Young T. Tse
*Attorney, Agent, or Firm*—Rennie William Dover; Robert D. Atkins

[57] ABSTRACT

A serial data signal is synchronized to a clock signal in a synchronization circuit (10). Synchronization is accomplished by generating a plurality of delayed versions of the serial data signal using serially connected delay elements (21–27). The delayed versions of the serial data signal are sampled using a set of flip-flops (11–18). The sampled delayed data signals appearing at the outputs of each flip-flop of the set of flip-flops (11–18) are used to determine which delayed data signal is most closely aligned to the clock signal. The output of the multiplexer (40) is an aligned serial data signal. In addition, a drift correction circuit (50) continuously monitors and corrects the alignment between the clock signal and the aligned serial data signal.

12 Claims, 3 Drawing Sheets

METHOD FOR SYNCHRONIZING SIGNALS AND STRUCTURES THEREFOR

BACKGROUND OF THE INVENTION

The present invention relates, in general, to the transmission of serial data, and more particularly, to the synchronization of a serial data signal to a clock signal.

Serial transmission of data is widely used in applications such as data transmission from a computer to a peripheral apparatus, data transmission within telephone switching equipment, data transmission over a computer backplane, and the like. Common approaches for serially transmitting data have included sending both clock and data signals to the receiving circuit, phase-locking a local clock to an incoming serial data stream, and slaving start/stop voltage controlled oscillators (VCOs) to a master VCO. Limitations of the technique of sending both clock and data signals include the requirement for two channels, and the potential for skew between the received clock and data. A drawback of phase-locking a local clock to an incoming data stream is the relatively long time required to synchronize the clock to the incoming serial data stream. A drawback of slaving two voltage controlled oscillators to a master VCO is that it is difficult to implement this type of circuit configuration for high-speed applications.

Accordingly, it would be advantageous to have a circuit and a method for synchronizing a serial data signal to a clock signal. It would be of further advantage to have a means for transmitting serial data over a single channel at very high speeds.

DETAILED DESCRIPTION OF THE DRAWINGS

Generally, the present invention provides a circuit and a method for synchronizing an incoming serial data stream to a clock signal. Synchronization is accomplished by generating a plurality of delayed versions of the serial data signal using delay elements or gates. The clock signal serves as a reference signal used in selecting the delayed version of the serial data signal that is most closely aligned to the clock signal. More particularly, the delayed output signals are sampled and the sampled delayed output signals are placed at the inputs of corresponding flip-flops. The falling edges of the clock signal causes the sampled delayed output signals to propagate to the outputs of the corresponding flip-flops. The data signals appearing at the outputs of the corresponding flip-flops are transmitted to a logic AND gate and logically ANDed to determine which delayed version of the serial data signal most closely aligns to the reference clock signal. The output signals appearing at the outputs of the AND gates serve as the select signals for a multiplexer. The output of the multiplexer is the aligned serial data signal that propagates through the multiplexer in accordance with the select signals.

In accordance with another aspect of the present invention, the aligned serial data signal is transmitted to a drift correction circuit which maintains the alignment between the clock and serial data signals. In this aspect of the present invention, the alignment of a negative transitioning clock edge to the rising edge of the serial data signals is continuously monitored. When the clock signal drifts from the serial data signal, a drift correction circuit re-aligns the clock signal to the aligned serial data signal.

Figure 1:
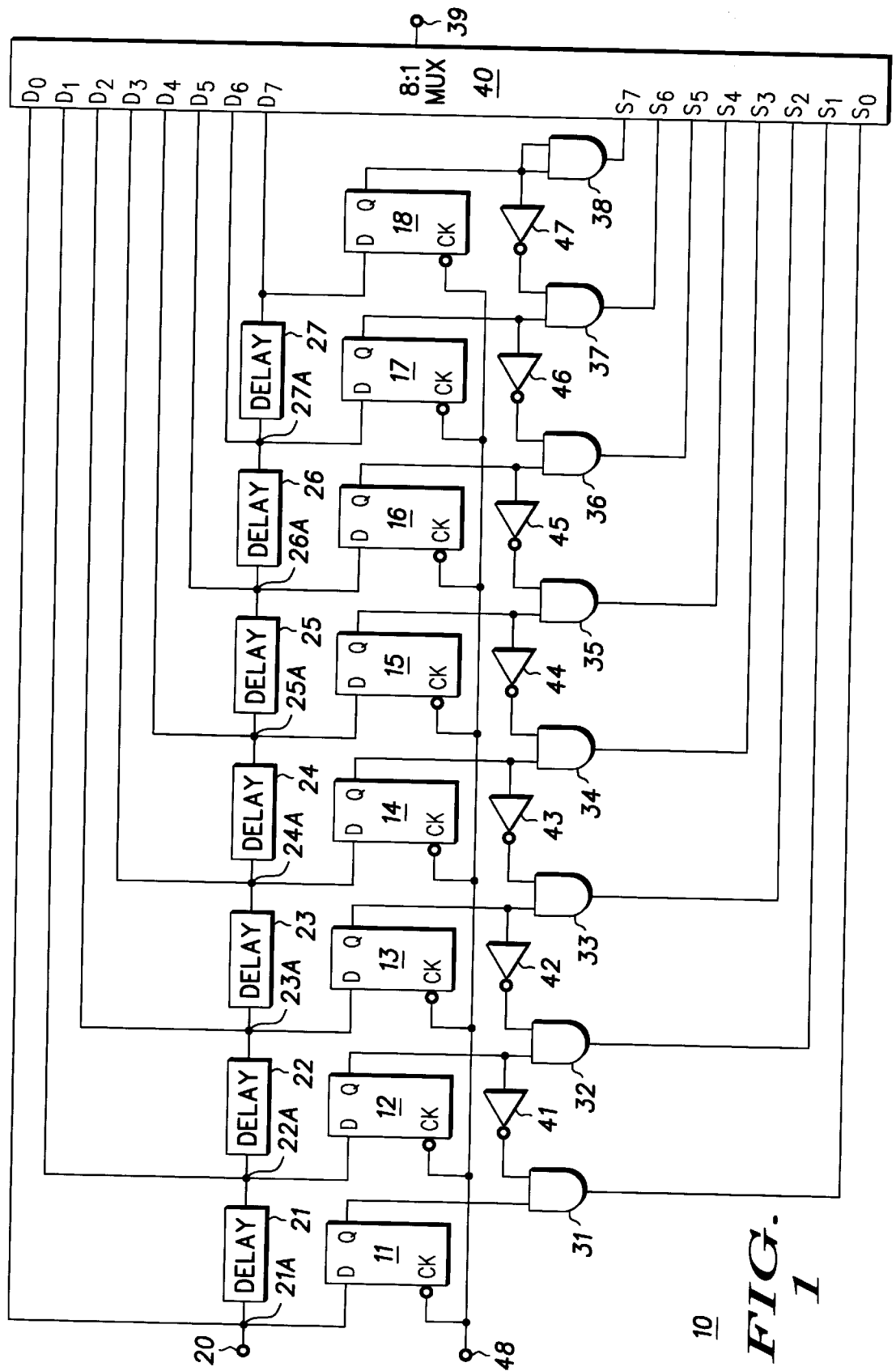
FIG. 1 is a schematic diagram of a synchronization circuit in accordance with a first embodiment of the present invention.

FIG. 1 is a schematic diagram of a synchronization circuit 10 in accordance with the present invention. Synchronization circuit 10 includes a plurality of flip-flops 11–18, a plurality of delay elements 21–27, a decode circuit comprising a plurality of AND gates 31–38, a plurality of inverters 41–47, and a multiplexer (MUX) 40. By way of example, the flip-flops are D-type flip-flops, wherein each D-type flip-flop has a data input, a clock input that is asserted by falling edges of the clock signal, and a data output. Further, multiplexer 40 has eight data inputs ($D_0$–$D_7$), eight select inputs ($S_0$–$S_7$) which serve as control inputs, and a data output at output terminal 39, i.e., MUX 40 is an 8:1 MUX.

More particularly, the clock inputs of each D-type flip-flop 11, 12, 13, 14, 15, 16, 17, and 18 are commonly connected to terminal 48 of synchronization circuit 10. Terminal 48 is coupled for receiving a reference clock signal from, for example, a system clock, a phase-locked loop circuit, or the like.

The data input of flip-flop 11 is coupled to input terminal 20 of synchronization circuit 10. An input terminal of delay element 21 is commonly connected to the data input of flip-flop 11, to input terminal 20, and to data input $D_0$ of MUX 40, thereby forming a node 21A. An output of flip-flop 11 is connected to a first input of AND gate 31. An output of AND gate 31 is coupled to select input $S_0$ of MUX 40.

The data input of flip-flop 12 is commonly connected to an output of delay element 21, to an input of delay element 22, and to data input $D_1$ of MUX 40, thereby forming a node 22A. Thus, the data input of flip-flop 12 is coupled to the data input of flip-flop 11 through delay element 21. An output of flip-flop 12 is connected to a first input of AND gate 32 and to a second input of AND gate 31 via inverter 41. An output of AND gate 32 is coupled to select input $S_1$ of MUX 40.

The data input of flip-flop 13 is commonly connected to an output of delay element 22, to an input of delay element 23, and to data input $D_2$ of MUX 40, thereby forming a node 23A. Thus, the data input of flip-flop 13 is coupled to the data input of flip-flop 12 through delay element 22. An output of flip-flop 13 is connected to a first input of AND gate 33 and to a second input of AND gate 32 via inverter 42. An output of AND gate 33 is coupled to select input $S_2$ of MUX 40.

The data input of flip-flop 14 is commonly connected to an output of delay element 23, to an input of delay element 24, and to data input $D_3$ of MUX 40, thereby forming a node 24A. Thus, the data input of flip-flop 14 is coupled to the data input of flip-flop 13 through delay element 23. An output of flip-flop 14 is connected to a first input of AND gate 34 and to a second input of AND gate 33 via inverter 43. An output of AND gate 34 is coupled to select input $S_3$ of MUX 40.

The data input of flip-flop 15 is commonly connected to an output of delay element 24, to an input of delay element 25, and to data input $D_4$ of MUX 40, thereby forming a node 25A. Thus, the data input of flip-flop 15 is coupled to the data input of flip-flop 14 through delay element 24. An output of flip-flop 15 is connected to a first input of AND gate 35 and to a second input of AND gate 34 via inverter 44. An output of AND gate 35 is coupled to select input $S_4$ of MUX 40.

The data input of flip-flop 16 is commonly connected to an output of delay element 25, to an input of delay element 26, and to a data input $D_5$ of MUX 40, thereby forming a node 26A. Thus, the data input of flip-flop 16 is coupled to the data input of flip-flop 15 through a delay element 25. An output of flip-flop 16 is connected to a first input of an AND gate 36 and to a second input of AND gate 35 via an inverter 45. An output of AND gate 36 is coupled to select input $S_5$ of MUX 40.

The data input of flip-flop 17 is commonly connected to an output of delay element 26, to an input of delay element 27, and to data input $D_6$ of MUX 40, thereby forming a node 27A. Thus, the data input of flip-flop 17 is coupled to the data input of flip-flop 16 through delay element 26. An output of flip-flop 17 is connected to a first input of AND gate 37 and to a second input of AND gate 36 via inverter 46. An output of AND gate 37 is coupled to select input $S_6$ of MUX 40.

The data input of flip-flop 18 is commonly connected to an output of delay element 27 and to data input $D_7$ of MUX 40, thereby forming a node 28A. Thus, the data input of flip-flop 18 is coupled to the data input of flip-flop 17 through delay element 27. An output of flip-flop 18 is commonly connected to a first and a second input of AND gate 38 and to a second input of AND gate 37 via inverter 47. An output of AND gate 38 is coupled to select input $S_7$ of MUX 40.

Although flip-flops 11–18 are shown as being in a single-ended configuration, this is not a limitation of the present invention. In other words, flip-flops 11–18 may be configured differentially such that the true output is coupled to the first input of a corresponding AND gate and the complementary output is coupled to the second input of the corresponding AND gate. It should be noted that when flip-flips 11–18 are configured differentially, inverters 41–47 are not used, i.e., the differential configuration provides an inverted output signal.

Figure 2:
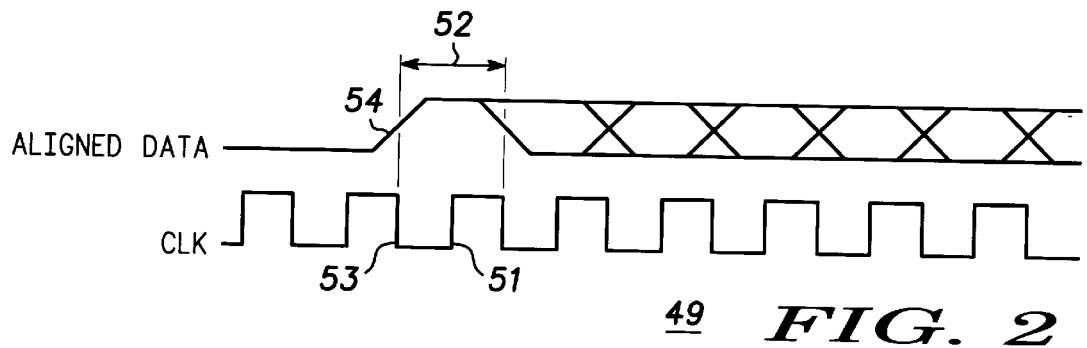
FIG. 2 is a timing diagram showing the relationship between the clock signal CLK and the serial data signal ALIGNED DATA for the synchronization circuit of FIG. 1.

The operation of synchronization circuit 10 will be described with references to FIGS. 1, 2, and 3. Now referring to FIG. 2, a timing diagram 49 showing the relationship between the clock signal CLK and the serial data signal ALIGNED DATA in accordance with the present invention is illustrated. In operation, clock signal CLK preferably has a 50% duty cycle and is continuously received by flip-flops 11–18 via the clock input at terminal 48. Serial data signal ALIGNED DATA is transmitted from output terminal 39 of MUX 40 and is referred to as the aligned serial data signal because the rising edge 51 of clock signal CLK is approximately centered within the data bit 52 of serial data signal ALIGNED DATA. In accordance with the present invention, the falling edge 53 of clock signal CLK corresponds to the rising edge 54 of data bit 52. Because the duty cycle of clock signal CLK is approximately 50%, synchronization circuit 10 uses the falling edge 53 of clock signal CLK to synchronize clock signal CLK to the serial data signal SERIAL DATA appearing at input terminal 20 (FIG. 1). Synchronization circuit 10 serves as an alignment circuit and causes a low state to high state transition edge of an electrical signal, i.e., the input data signal, to align with the high state to low state transition edge of the clock signal. As those skilled in the art are aware, a high state is also referred to as a logic high, a logic one, or a logic one signal and a low state are also referred to as a logic low, a logic zero, or a logic zero signal.

Figure 3:
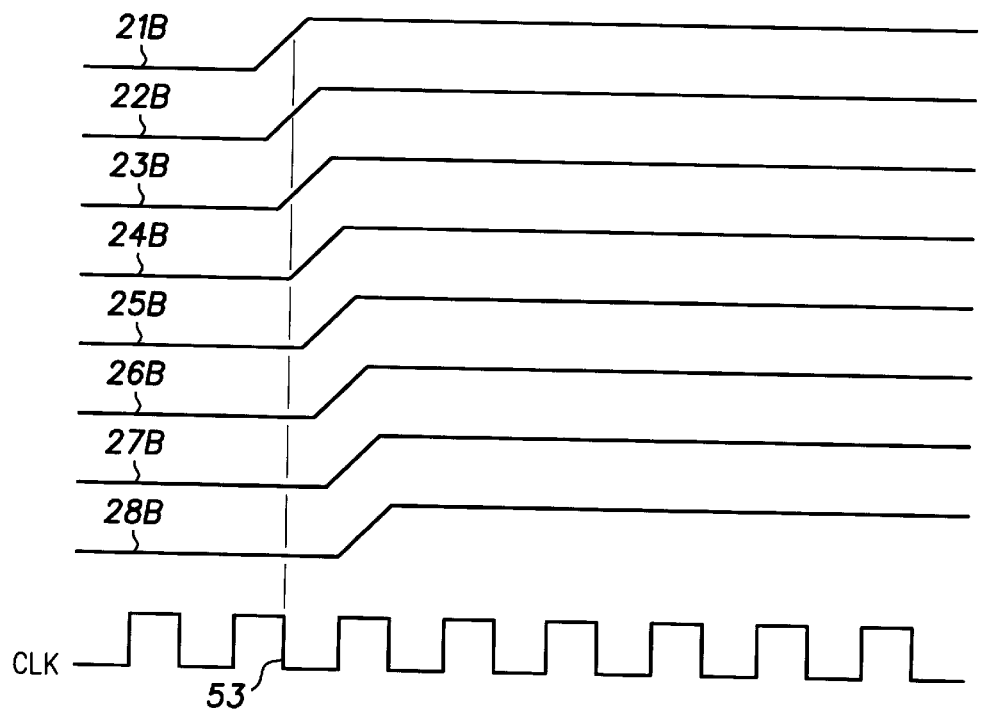
FIG. 3 is a timing diagram of received data and delayed data through the delay elements with respect to a clock signal for the synchronization circuit of FIG. 1.

FIG. 3 shows the timing relationship between clock signal CLK and the delayed serial data signals 21B–28B. It should be understood that the same reference numerals are used in the figures to denote the same elements. In accordance with one example of the present invention, flip-flops 11–18 are clocked by the falling edges of clock signal CLK. It should be understood that the particular edge of clock signal CLK that serves as the active edge is not a limitation of the present invention. In other words, flip-flops 11–18 may be clocked by either the falling or rising edges of clock signal CLK.

The serial data signal SERIAL DATA arrives at input terminal 20 and propagates through delay elements 21–27. The propagation delay of serial data signal SERIAL DATA is set in accordance with the amount of delay introduced by delay elements 21–27. For example, if each delay element introduces a delay of 100 picoseconds (ps), serial data signal SERIAL DATA appears at node 22A one hundred picoseconds after it appears at node 21A. Likewise, serial data signal SERIAL DATA appears at node 23A one hundred picoseconds after it appears at node 22A and two hundred picoseconds after it appears at node 21A; serial data signal SERIAL DATA appears at node 24A one hundred picoseconds after it appears at node 23A and three hundred picoseconds after it appears at node 21A; serial data signal SERIAL DATA appears at node 25A one hundred picoseconds after it appears at node 24A and four hundred picoseconds after it appears at node 21A; serial data signal SERIAL DATA appears at node 26A one hundred picoseconds after it appears at node 25A and five hundred picoseconds after it appears at node 21A; serial data signal SERIAL DATA appears at node 27A one hundred picoseconds after it appears at node 26A and six hundred picoseconds after it appears at node 21A; and serial data signal SERIAL DATA appears at node 28A one hundred picoseconds after it appears at node 27A and seven hundred picoseconds after it appears at node 21A. The delayed serial data signals appearing at nodes 21A–28A are illustrated in FIG. 3 as signals 21B–28B, respectively. It should be understood that the amount of delay introduced by each delay element 21–28 is not limited to being 100 ps. For example, the delay may be 50 ps, 150 ps, 200 ps, etc. In other words, the delay through each delay element is a design choice.

Still referring to FIGS. 1 and 3, falling edge 53 of clock signal CLK triggers flip-flops 11–18 such that data appearing at their inputs propagates to their outputs. Thus, the period of clock signal CLK and the delay of each delay element 21–27 are selected so that a falling edge 53 of the clock signal occurs at some time within the total delay of delay elements 21–27. Thus, in the example of FIG. 1, wherein synchronization circuit 10 has seven delay elements 21–28 and each delay element has a 100 picosecond delay, the period of the clock is at most 700 ps. It should be noted that the number of delay elements, the amount of delay introduced by each delay element, and the period of the clock signal are not limitations of the present invention. Thus, the total delay of delay elements 21–27 is set so that the amount of delay is slightly larger than the clock period. Therefore, each delay element introduces a delay that is approximately 1/N of the period of the clock where N is the number of delay elements. In this example, the number of delay elements is 7.

In the example illustrated by FIG. 3, falling edge 53 of clock signal CLK occurs after rising edge 54 of serial data signal SERIAL DATA appearing at node 21A (and the input to flip-flop 11) transitions from a low to a high logic level. Thus, a logic one propagates through flip-flop 11 in response to falling edge 53 of clock signal CLK. Similarly, falling edge 53 of clock signal CLK occurs after the rising edge of serial data signal SERIAL DATA appearing at node 21B (and the input to flip-flop 12) transitions from a low to a high logic level. A logic one propagates through flip-flop 12 in response to falling edge 53 of clock signal CLK. However, falling edge 53 of clock signal CLK occurs before the rising edge of serial data signal SERIAL DATA appears at nodes 23B–28B (and the inputs to flip-flops 13–18, respectively). A logic zero propagates through flip-flops 13–18 in response to falling edge 53 of clock signal CLK. Accordingly, one input of AND gate 31 receives a logic one signal and the other input receives a logic 0 signal so that the output of AND gate 31 is a logic zero signal. AND gate 32, on the other hand, outputs a logic one signal because both inputs are at a logic one level. AND gates 33–38 output a logic zero signal because at least one of their inputs receives a logic zero signal. The logic high level from AND gate 32 asserts the select input $S_1$ which causes the signal appearing at data input $D_1$ to be transmitted as the selected signal to output terminal 39 of MUX 40. The clock signal CLK is aligned to the signal appearing at data input $D_1$, such that the rising edge 51 is centered within serial data bit 52. The aligned clock and data signals are illustrated in FIG. 2.

Figure 4:
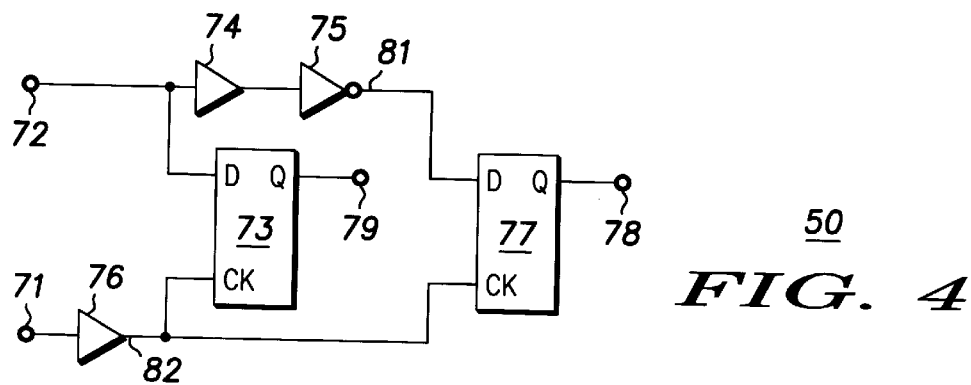
FIG. 4 is a schematic diagram of a drift correction circuit in accordance with the present invention.

FIG. 4 is a schematic diagram of a drift correction circuit 50 in accordance with another embodiment of the present invention. Drift correction circuit 50 includes a D-type flip-flop 73 and a D-type flip-flop 77 wherein each D-type flip-flop or drift correction flip-flop includes a data input, a clock input, and a data output. The clock input of flip-flop 73 is connected to the clock input of flip-flop 77. In addition, the clock inputs are commonly connected to a delayed clock input through buffer circuit 76. The data input of flip-flop 73 is connected to input terminal 72. In addition, the data input of flip-flop 73 is coupled to the data input of flip-flop 77 through two sub-circuits or two serially coupled delay elements, such as buffer circuits 74 and 75. Buffer circuit 74 is a non-inverting buffer circuit and buffer circuit 75 is an inverting buffer circuit that provides the complement of the data at input terminal 72.

Figure 5:
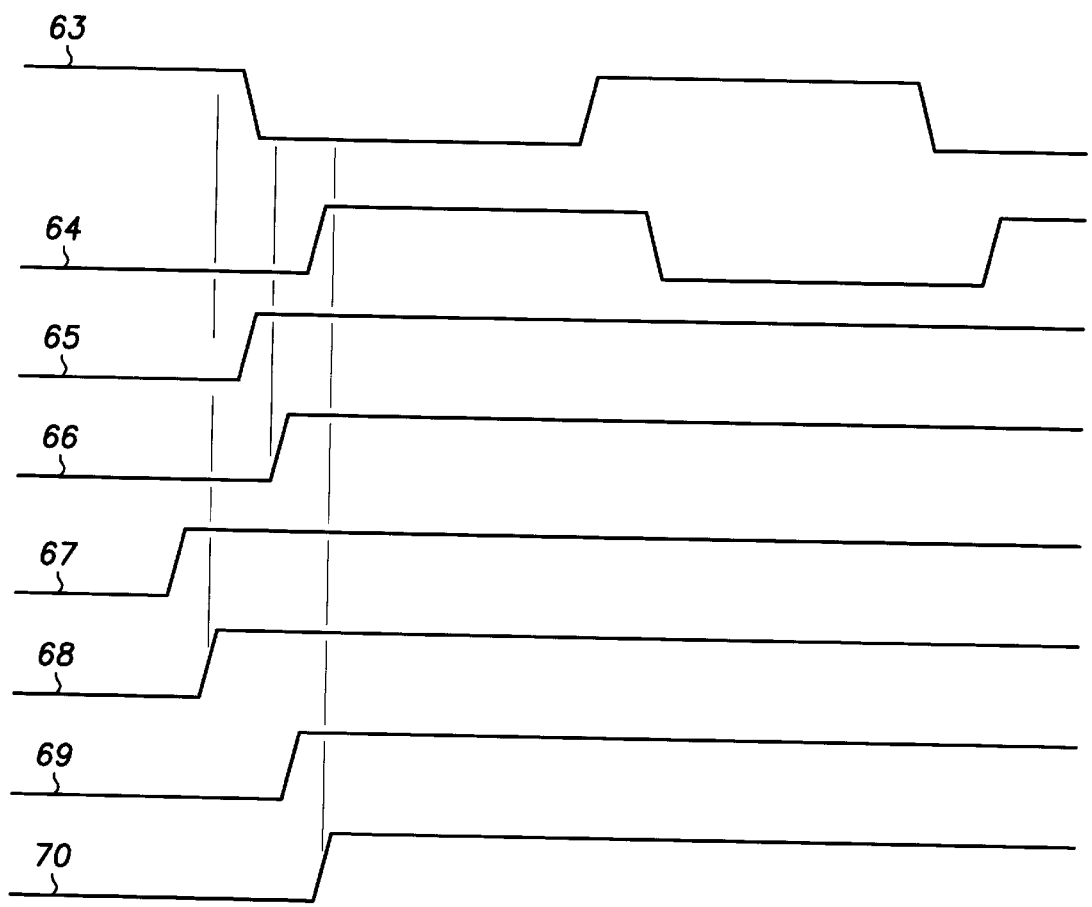
FIG. 5 is a timing diagram for the drift correction circuit of FIG. 4.

The operation of drift correction circuit 50 will be described with reference to FIGS. 4 and 5. In accordance with the first example of the present invention, terminal 72 of drift correction circuit 50 is connected to terminal 48 of synchronization circuit 10 and terminal 71 of drift correction circuit 50 is connected to output terminal 39 of synchronization circuit 10. Accordingly, drift correction circuit 50 receives a clock signal, CLK, at terminal 72. An aligned serial data signal, ALIGNED DATA, is received at terminal 71 of drift correction circuit 50. The aligned serial data signal is transmitted to node 82 via a buffer circuit 76 and is therefore referred to as a delayed serial data signal. The delayed serial data signal serves as a clock signal for flip-flops 73 and 77. When the clock signal appearing at terminal 72 is aligned to the serial data signal appearing at terminal 71, flip-flops 73 and 77 are clocked low as will be described with reference to timing traces 63, 64, 65, and 66. Timing trace 63 illustrates the clock signal received at terminal 72; trace 64 illustrates the delayed inverted clock signal appearing at node 81; trace 65 illustrates the serial data signal at terminal 71 when the data signal is aligned to the clock signal appearing at terminal 72; and trace 66 illustrates the delayed aligned serial data signal. Because the data and clock signals are correctly aligned, no correction is required by drift correction circuit 50. It should be noted that when the data and clock signals are aligned, the outputs of flip-flops 73 and 77 at output terminals 79 and 78, respectively, are at a logic low level.

When the serial data arrives at terminal 71 by an amount of time greater than or equal to the propagation delay of buffer circuit 76, the serial data is said to be early. The propagation delay of buffer circuit 76 is set to approximately match the time delay in generating the aligned data at output terminal 39 with respect to the falling edge of the signal CLK. Referring to the timing traces of FIG. 5, the early serial data appearing at terminal 71 is illustrated by trace 67 and the early delayed serial data is illustrated by trace 68. In this case, the early delayed data signal serves as a clock signal for flip-flops 73 and 77. Thus, a logic high signal appears at output terminal 79 and a logic low signal appears at output terminal 78 of flip-flops 73 and 77, respectively. To further illustrate this point, the early delayed serial data trace 68 may be compared to the clock signal for timing trace 63 and the delayed inverted clock signal for timing trace 64. In this case, the signals on output terminals 78 and 79 of drift correction circuit 50 may be used to decrease the frequency of the clock signal to realign the clock signal to the data signal.

When the serial data arrives at terminal 71 by an amount of time less than the propagation delay of buffer circuit 76, the serial data is said to be late. Referring to FIG. 5, the late serial data appearing at terminal 71 is illustrated by trace 69 and the late delayed serial data is illustrated by trace 70. In this case, the late delayed data signal serves as a clock signal for flip-flops 73 and 77. Thus, a logic low signal appears at output terminal 79 and a logic high signal appears at output terminal 78 of flip-flops 73 and 77, respectively. To further illustrate this point, the late delayed data trace 70 may be compared to the clock signal for timing trace 63 and the delayed inverted clock signal for timing trace 64. In this case, the signals on output terminals 78 and 79 of drift correction circuit 50 may be used to increase the frequency of the clock signal to realign the clock signal to the data signal.

By now it should be appreciated that the present invention provides a circuit for synchronizing a serial data signal to a clock signal. The synchronization circuit receives a single channel of serially transmitted high speed data and provides a series of delay elements to delay the data. A low-to-high transition at a particular point in the data delay path corresponds to a high-to-low transition of a locally generated clock signal. At this point in the delayed data path, data bits are centered about the rising edge of the clock. By sampling data on the rising edge of the clock, serially transmitted data is properly received.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A synchronization circuit, comprising:
   first and second flip-flops having commonly coupled clock inputs for receiving a clock signal;
   a delay element having an input coupled to a data input of the first flip-flop and an output coupled to a data input of the second flip-flop;

an AND gate having a first input coupled to an output of the first flip-flop and a second input coupled to an output of the second flip-flop; and a multiplexer having a first input coupled to the output of the delay element, a second input coupled to the output of the AND gate, and an output for supplying an aligned data signal.

2. The synchronization-circuit of claim 1, further including a drift correction circuit having first and second inputs and an output, the first input coupled for receiving the clock signal and the second input coupled to the output of the multiplexer.

3. The synchronization circuit of claim 2, wherein the drift correction circuit includes:

a third flip-flop having first and second inputs and an output, wherein the first input is coupled to the first input of the drift correction circuit;

a fourth flip-flop having first and second inputs and an output;

a first delay circuit having an input and an output, the input coupled to the first input of the third flip-flop and the output coupled to the first input of the fourth flip-flop; and a first buffer having an input and an output, the input coupled to the second input of the drift correction circuit and the output commonly coupled to the second inputs of the third and fourth flip-flops.

4. The synchronization circuit of claim 3, wherein the first delay circuit is comprised of:

a second buffer having an input coupled to the input of the first delay circuit; and an inverter having an input coupled to an output of the second buffer and an output coupled to the output of the first delay circuit.

5. The synchronization circuit of claim 3, wherein the first delay circuit has a delay twice that of the first buffer.

6. A drift correction circuit for aligning a first electrical signal to a second electrical signal, comprising:

a first flip-flop having a data input coupled for receiving a clock signal, a clock input coupled for receiving a data signal, and an output that provides the first electrical signal;

a second flip-flop having a data input coupled for receiving the clock signal a clock input coupled for receiving the data signal, and an output that provides the second electrical signal that is aligned to the first electrical signal;

a delay circuit having an input and an output, where the input is coupled to the data input of the first flip-flop and the output is coupled to the data input of the second flip-flop; and a buffer having an input and an output, wherein the input receives the data signal and the output is coupled to the clock inputs of the first and second flip-flops.

7. The drift correction circuit of claim 6, wherein the delay circuit includes a non-inverting buffer and an inverting buffer.

8. A method for synchronizing a selected signal to a clock signal, comprising the steps of:

receiving a data signal;

generating a delayed data signal from the data signal;

latching the data signal on a transition of the clock signal to generate a latched data signal;

latching the delayed data signal on the transition of the clock signal to generate a latched delayed data signal;

logically ANDing the latched data signal and the latched delayed data signal; and selecting one of the data signal and the delayed data signal as a selected signal, wherein the selected signal is synchronized to the clock signal when the latched data signal has a first logic value and the latched delayed data signal has a second logic value.

9. The method of claim 8, wherein the step of generating the delayed data signal from the data signal includes delaying the data signal by an amount of time that is less than a period of the clock signal.

10. The method of claim 8, further including the step of adjusting a frequency of the clock signal in response to the selected signal drifting from the clock signal.

11. The method of claim 10, wherein the step of adjusting the frequency of the clock signal includes decreasing the frequency of the clock signal when the selected signal leads the clock signal.

12. The method of claim 10, wherein the step of adjusting the frequency of the clock signal includes increasing the frequency of the clock signal when the selected signal lags behind the clock signal.

* * * * *